Figure 1:
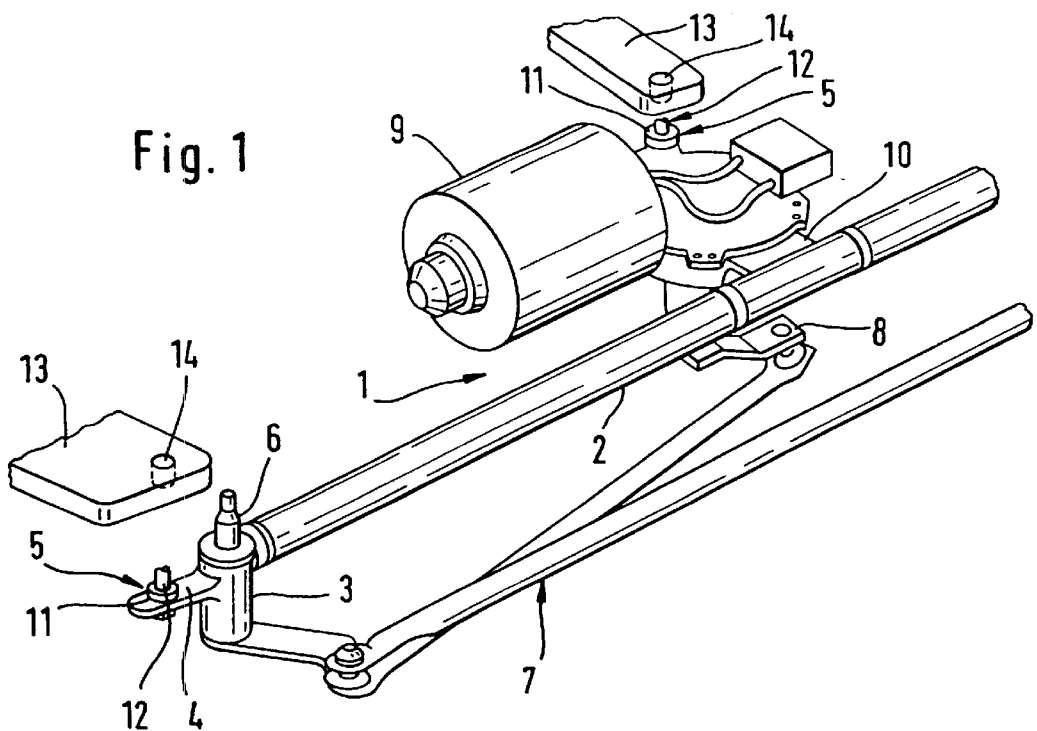

United States Patent

Schael et al.

[11] Patent Number: 5,960,512
[45] Date of Patent: Oct. 5, 1999

[54] WINDSHIELD WIPER ASSEMBLY WITH A NOISE AND VIBRATION-DAMPING FASTENER

[75] Inventors: Oliver Schael, Kirchenlengem; Alessandro Ortale, Langenbrettach, both of Germany

[73] Assignee: ITT Manufacturing Enterprises Inc., Wilmington, Del.

[21] Appl. No.: 08/849,919

[22] PCT Filed: Oct. 17, 1995

[86] PCT No.: PCT/EP95/04069

§ 371 Date: Aug. 21, 1997

§ 102(e) Date: Aug. 21, 1997

[87] PCT Pub. No.: WO96/20101

PCT Pub. Date: Jul. 4, 1996

[30] Foreign Application Priority Data

Dec. 23, 1994 [DE] Germany .............................. 44 46 315

[51] Int. Cl.⁶ ..................................................... A47L 1/00
[52] U.S. Cl. ....................................................... 15/250.31
[58] Field of Search ............................. 15/250.3, 250.31; 296/96.17, 96.15; 248/604, 635; 403/228, 265, 268; 16/2.1; 267/140.11, 140.5, 141, 141.1, 141.2, 141.3, 141.4, 141.5

[56] References Cited

U.S. PATENT DOCUMENTS

| 3,743,059 | 7/1973 | Morse et al. ................................. 188/1 |
| 3,754,317 | 8/1973 | Taylor ....................................... 29/451 |
| 5,074,613 | 12/1991 | Unterborn et al. ...................... 296/192 |
| 5,131,619 | 7/1992 | Daugherty et al. ...................... 248/635 |
| 5,290,018 | 3/1994 | Watanabe et al. ....................... 267/293 |
| 5,441,227 | 8/1995 | Hayashi ................................... 248/274 |
| 5,549,271 | 8/1996 | Hamaekers .............................. 248/621 |
| 5,609,329 | 3/1997 | Scholl ..................................... 267/141 |
| 5,634,726 | 6/1997 | Edele et al. ............................. 384/276 |
| 5,706,547 | 1/1998 | Kobayashi ............................. 15/250.3 |

FOREIGN PATENT DOCUMENTS

| 651498 | 9/1937 | Germany ............................... 403/228 |
| 22 37 516 | 2/1974 | Germany . |
| 40 36 367 | 5/1992 | Germany . |
| 4327946 | 2/1995 | Germany . |
| 4334926 | 4/1995 | Germany . |
| 2088707 | 6/1982 | United Kingdom .................. 15/250.3 |
| 2219932 | 12/1989 | United Kingdom .................. 15/250.3 |

*Primary Examiner*—Robert Warden
*Assistant Examiner*—Andrew Aldag
*Attorney, Agent, or Firm*—J. Gordon Lewis

[57] ABSTRACT

A noise-damping or vibration-damping attachment feature for a windshield wiper system includes a damping element which is located in an opening of an attachment section of the windshield wiper system and itself supports, in a passage opening, a casing to hold an attachment screw or an attachment bolt, and to refine the aforesaid attachment feature in such a manner that it can be produced at low cost while dispensing with a manual mounting of the damping element. The attachment section and the bushing are manufactured as a single part from the same material, wherein the bushing connected by means of ridges at least temporarily to the attachment section, and the damping element is poured or injected into the space between bushing and attachment section.

9 Claims, 2 Drawing Sheets

WINDSHIELD WIPER ASSEMBLY WITH A NOISE AND VIBRATION-DAMPING FASTENER

The invention pertains to a windshield wiper system with a noise-damping or vibration-damping attachment feature for attachment to a vehicle chassis according to the preamble of claim 1.

From DE 4,036,367 A1 a preassembled windshield wiper system is known whose motor support plate and wiper bearing housing is equipped with attachment features for noise-damping or vibration-damping attachment to the vehicle chassis. The wiper bearing housing has a lateral molded protrusion that has an attachment section with a passage opening. At the edge of a motor support plate which belongs to the windshield wiper system there is likewise an attachment section with a passage opening. There is a hollow, cylindrical damping element made of resilient material and having an annular groove running along its outer perimeter in the passage openings of the aforesaid attachment sections. The ring groove is located roughly in the longitudinal center of the damping element. There is a metal bushing used to hold an attachment bolt or an attachment screw installed in the central passage opening of the damping element.

A disadvantage of these known attachment features is that the insertion of the damping elements into the attachment sections and of the casing into the damping elements has to be done manually and thus represents a cost-intensive and complicated assembly process.

From DE 3,903,976 A1 another preassembled windshield wiper system is known which contains a motor support unit produced as a pressure-cast article. Molded onto the motor support unit is a lateral attachment eyelet, designed to be open at one edge so that a resilient damping element of the kind described in DE 4,036,367 A1 can be inserted from the side into the passage opening. This design does indeed result in a simplification with regard to the insertion of the damping element into the passage opening of the attachment section, however, here too, the disadvantages stated above still apply.

Therefore the purpose of the invention is to refine a windshield wiper system of the type described above in such a manner that the noise-damping or vibration-damping attachment feature can be manufactured at low cost, while dispensing with a manual assembly of the damping element and of the casing to the attachment section.

According to this invention, the problem is solved by a windshield wiper system with the features of claim 1.

The basic idea underlying the invention consists in that the damping element, which is manufactured preferably as a rubbery element from elastomeric material, is cast or injected-molded directly into the relevant position for it in the attachment section of the corresponding support portion of the windshield wiper system. Or stated in other words, the damping element is cast or is injected immediately after its manufacturing process into the space between the required bushing and the passage opening of the attachment section. This method has the advantage that a complicated preliminary assembly by snapping a prefabricated damping element into the passage opening of the attachment section and the installation of the bushing into the passage opening of the damping element can be omitted.

Because the bushing is manufactured as a single piece together with the attachment section or the corresponding component of the windshield wiper system which has the attachment section, there is a cost advantage with respect to the manufacture of this part of the windshield wiper system, and the insertion of a separate bushing into a corresponding molding tool for the purpose of casting or injection with the damping element can be omitted. The ridge or the ridges which connect the bushing as a single piece to the attachment section are essentially intended to hold the bushing in its predefined position for the injection of the damping element. In order, on the other hand, to prevent the transfer of solid-borne sound or vibrations, which will occur during operation of the windshield wiper system to the bushing and thus to the vehicle chassis, the ridges must be constructed so that they will not transmit, or will transmit at most a negligible amount, of the solid-borne sound or vibrations. Accordingly, the ridges are constructed so thin and are shaped such that they output their vibrational energy essentially to the damping element which surrounds them, and not to the bushing.

It is also possible for the ridges to connect the bushing for only a limited time, that is, temporarily, to the attachment section of the windshield wiper system. Expressed differently, this means that the ridges are designed so that they are consciously broken off after performing their positioning task. According to one favorable design of the invention, set fracture points are located in the ridges for this purpose. The breaking of the ridges occurs either after a certain operating time of the windshield wiper system, or the breaking is effected by tightening the windshield wiper system to the vehicle chassis by means of appropriate, brief application of mechanical force. Since the parts of the ridges after the break are no longer joined together, they likewise cannot transmit any solid-borne sound or vibrations from the windshield wiper system to the bushing.

The advantage is that the particular support part of the windshield wiper system which has the attachment section can be manufactured according to requirement, either as a cast article and, preferably in that case, as a pressure-cast article using a suitable metal or a suitable metal alloy, or even as an injection-molded article using a suitable plastic. The damping element in this case can be injected around the bushing into the attachment section of the windshield wiper system using a two-component technology.

Claims 2 to 7 specify several favorable embodiments which are directed, either individually or in combination at positioning the bushing accurately and dependably in the passage opening of the attachment section of the windshield wiper system, and in addition, at most a negligible transmission of solid-borne sound or vibrations will be transferred from the windshield wiper system to the bushing and thus to the vehicle chassis. The properties of claims 5 and 7 are directed toward a particularly exact and dependable positioning of the bushing within the passage opening of the attachment section. Due to the lamellar construction of the ridges, their engagement points on the outer mantle surface of the bushing can be distributed more favorably. Because the lamellar ridges extend past the edge of the passage opening at one or at both outer surfaces of the attachment section, a solid connection and a stable positional orientation of the lamina is achieved with respect to the attachment section. Thus, any potential tilting of the bushing within the passage opening of the attachment section is [more] successfully counteracted than with ridges which have a nearly point-shaped cross section.

In another embodiment according to claim 8, a continuous lamina, which as a whole bridges the annular gap between the bushing and the edge of the passage opening in the attachment section, appears instead of several individual ridges or lamina. This design has the particular advantage that the casting or injection-molding tool for the manufacture of the corresponding support portion of the windshield wiper system is less complicated and thus lower in cost than that for the previously described designs. In this case, however, it is necessary to inject or to cast the damping element from both sides into the attachment section. The damping element thus consists more or less of two separate parts which are mutually separated by the closed lamina in the annular gap. In order to prevent as much as possible the transfer of sound or vibration transmitted through solids through the lamina in this kind of design, compared to a planar structure of the lamina, a corrugated or pleated design of the lamina according to claim 9 will be an advantage.

The mounting of a windshield wiper system of this kind on the vehicle chassis takes place in the conventional manner. A mounting bolt or a mounting screw with corresponding washer is inserted through the bushing and screwed to the vehicle chassis. Since in the manufacture of the vehicle chassis and also in the manufacture of the windshield wiper system, certain dimensional tolerances are required with regard to the attachment point for the windshield wiper system to the vehicle chassis, in practice partial attachment sections with an elongated passage opening can be used to hold a corresponding oval bushing and a corresponding oval damping element in order to compensate for these tolerances. The present invention includes attachment features shaped in this manner and thus it is not limited to a circular passage opening in the attachment section of the windshield wiper system and to a damping element with annular cross section nor to a bushing with an annular cross section.

The invention will be explained in greater detail below based on embodiments. The figures show:

FIG. 1: A preassembled windshield wiper drive device presented in schematic, perspective view with the chassis parts to which the device can be attached, FIG. 2: A top view of an attachment section of a windshield wiper drive device, FIG. 3: A cross section along the line III—III from FIG. 2, FIG. 4: A top view of another embodiment of an attachment section, FIG. 5: A cross section along the line V—V in FIG. 4, FIG. 6: An attachment section of a windshield wiper drive device without damping element, shown in perspective view, and FIG. 7: Another example of an attachment section without damping element, shown in perspective view.

FIG. 1 presents a windshield wiper drive device to be attached as a preassembled unit to the chassis of a motor vehicle, shown schematically in a partial view. The drive components needed to drive the wiper arms (not shown) are mounted on a support frame 1, which features a connecting rod 2 at whose free ends there are bushing-like bearing elements 3 running transverse to this, of which only the left one is shown in FIG. 1. The bearing element 3 has at its outer perimeter an attachment protrusion 4 molded on, whose edge region is designed as an attachment section 5. A wiper shaft 6 can rotate in the bearing element 3, but it is held axially and the wiper arm (not illustrated) is attached without rotational play. The wiper shafts 6 arranged at either end and connected by means of a multipart coupling linkage 7 which connects both wiper shafts 6 to the rotary motion synchronizer and is driven by a crank 8 which is mounted without rotational play to the drive shaft (not illustrated) of a drive motor 9. The drive motor 9 and its transmission, if any, are attached to a plate-like extender 10 which is held against the connecting rod 2. In the vicinity of the edge of the extender 10 there is another attachment section 5.

For vibration-damping attachment of the windshield wiper drive unit to the vehicle chassis, the attachment section 5 of the bearing element 3 and the attachment section 5 of the extender 10 have an annular passage opening in which a hollow, cylindrically shaped elastomeric vibration damping element 11 is buttoned in. The preassembled windshield wiper drive unit is attached in a known manner at the provided location in the engine compartment of the motor vehicle to chassis parts 13 intended specifically for this purpose; FIG. 1 shows two of them schematically. The chassis parts 13 have corresponding threaded holes 14, into which the attachment screws 12 can be screwed.

Figure 3:
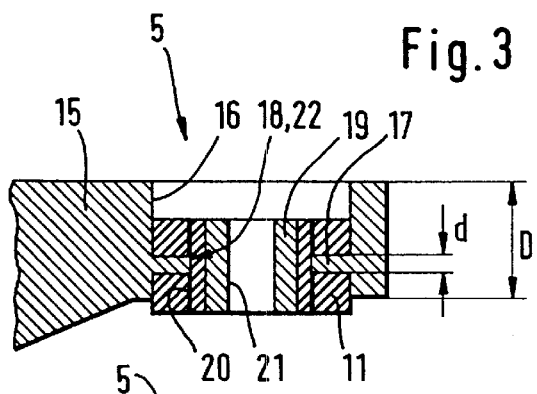
Figure 2:
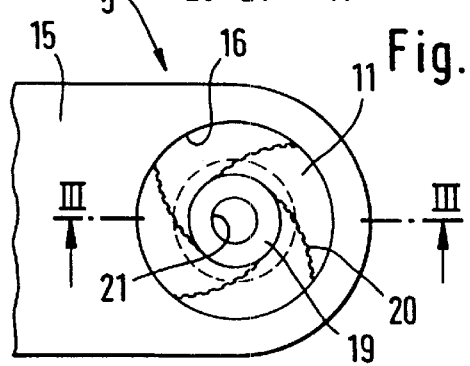

FIGS. 2 and 3 present one example of how a noise-damping or vibration-damping attachment feature can be designed for attachment of a windshield wiper system to a vehicle chassis. A support unit 15 of a windshield wiper system, which can have an attachment protrusion 4 of a wiper bearing 3 of the kind shown in FIG. 1, has at one free end an attachment section 5 of relatively large thickness D. This attachment section 5 has a circular opening 16 and from its inner surface a perimeter rib 17 with thickness d extends inward and forms the perimeter edge of a circular passage opening 18. A hollow cylindrical bushing 19 is positioned concentrically in the passage opening 18 and is connected as a single piece by means of four ridges 20 to the attachment section 5 of the support unit 15. The ridges 20 are of lamina-like design and have a vane-like appearance, that is, they are arc-shaped, between the casing 19 and the attachment section 5. Relative to their width, the lamina-like ridges are arranged at a right angle to the plane passing through the rib 17. They exit roughly tangentially from the cylindrical, outer surface of the bushing 19 and extend up to the inside of the opening 16, in which they enter again roughly tangentially. Thus, the lamina extend past the edge of the passage opening 18 and are connected on both sides to the rib 17. Due to this design, a dependable and precise positioning of the casing 19 can be attained within the passage opening 18, whereby likewise a tilting of the casing 19 is effectively prevented.

The damping element 11 was produced by injection of elastomeric material into the space formed between the cylindrical, outer surface of the casing 19 and the recess 16 including rib 17 and ridges 20, which was additionally bounded by a corresponding injection molding mold. Thus it has an annular cross section and its volume encloses the rib 17 and the ridges 20. In connection with the attachment of the windshield wiper drive unit to the vehicle chassis, a mounting screw is inserted from above, using an intermediate washer of appropriate size, into the passage opening 21 of the casing 19 and is then screwed to the corresponding part of the chassis 13 (FIG. 1).

Figure 5:
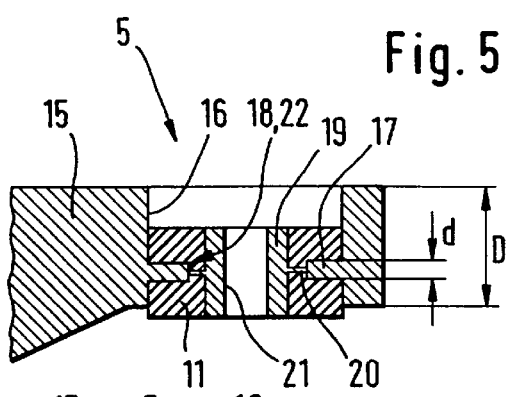
Figure 4:
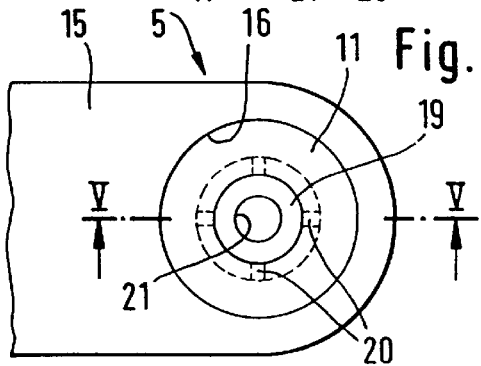

FIGS. 4 and 5 show another example of an attachment section 5 which corresponds in its essential parts to the example illustrated in FIGS. 2 and 3. Therefore, a repetition of the description of these essential parts will be omitted. The significant difference from the example of FIGS. 2 and 3 is that now several, that is, four, spoke-like ridges 20 with small round or even angular cross sections are distributed uniformly around the perimeter of the casing 13 and connect the casing 19 with the interior edge of the rib 17. The ridges 20 are positioned radially and are thin enough so that they can hold the bushing 20 [sic; 19] in the desired position until after casting or injection-molding of the damping element 11, but can transmit hardly any sound or vibrations. It can even be an advantage to make the ridges very thin or to provide them with a set fracture point, so that they will break off, for example, during assembly of the windshield wiper system to the vehicle chassis due to the occurring mechanical stress occurring thereby, or due to a consciously applied mechanical stress, or so that they tear off from the bushing 19 or from the rib 17.

It is also possible for a single ridge 20 to be positioned essentially in the plane passing through the rib 17, provided as connector between the casing 19 and the rib 17 of the attachment section 5. In this case, the ridge 20 is a single, closed, thin lamina, which seals the ring gap between the perimeter of the casing 19 and the edge of the passage opening. The damping element 11 now consists of an upper and a lower section which are separated by the rib 17 and the ridge 20. There is no material connection between the two parts of the damping element. The injection of the two parts of the damping element 11 likewise takes place by injection molding in a corresponding mold; the injection must occur in two hollow mold cavities separated from each other by the ridge 20. Otherwise, this connecting feature is handled exactly the same as in the example described above. The advantage for an effective avoidance or limitation of the transmission of solid-borne sound or vibration via this ridge 20 is for the ridge 20 to be formed corrugated or pleated with respect to its radial width.

Figure 6:
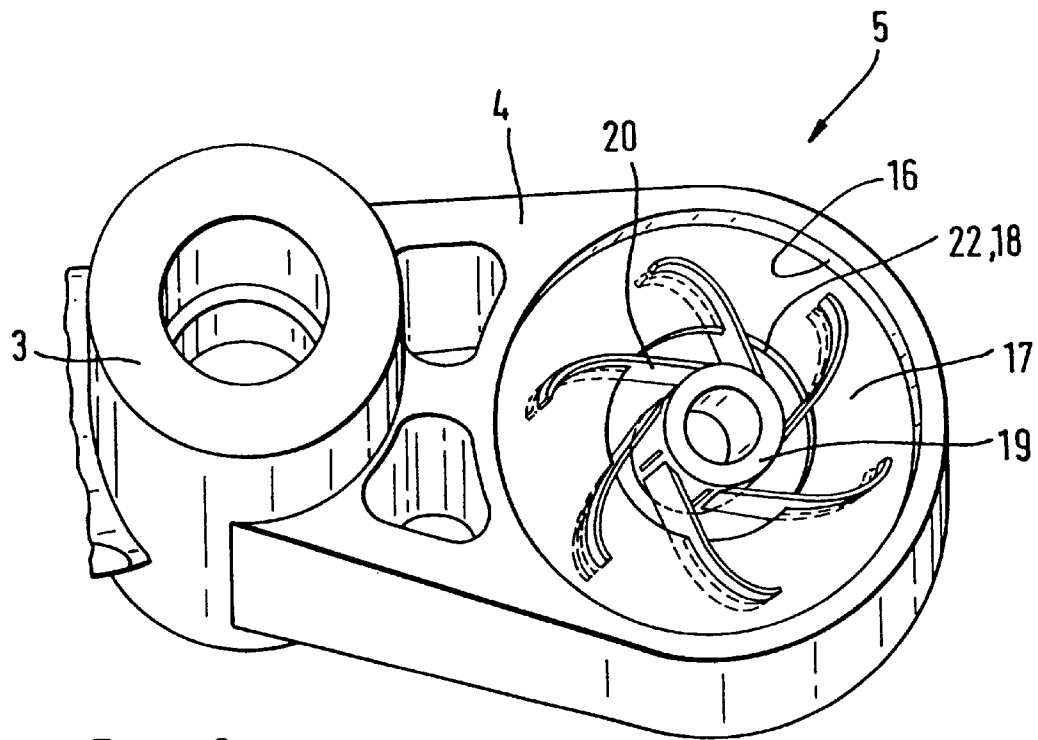

The design of an attachment section 5 illustrated in FIG. 6 is very similar to the example illustrated in FIGS. 2 and 3. In order better to illustrate the structure of the attachment section, a perspective mode of illustration was selected in FIG. 6 and the representation of the damping element was left off. On the left side of the cut-away representation of FIG. 6 we see the bearing element 3 for a wiper shaft 6 (FIG. 1) (not illustrated). At the outer perimeter of this bearing element 3 on the right side, the attachment protrusion 4 is molded on which features an attachment section 5. The annular rib 17 is visible in the opening 16; the edge 22 of this rib forms the circular passage opening 18. Within the passage opening 18 there is a concentric bushing 19 which engages in the passage opening 18 and it is positioned with regard to its longitudinal direction nearly in the middle of this passage opening 18. There are six ridges 20 arranged like vanes distributed uniformly around the perimeter of the casing. The ridges 20 are of lamina-like design and are aligned, with respect to their width, at a right angle to the rib 17. In addition, they exit at least roughly tangentially from the outer mantle surface of the bushing 19 and run arc-like in the direction of the inner wall of the circular cross-section opening 16. Thus they extend over the edge 22 of the rib 17 and are also connected on both sides to the rib 17. The sides of the ridges 20 turning away from the casing 19 in this case already end at a distance from the inner wall of the opening 16. It is thus evident that the entire element illustrated in FIG. 6 represents a single structural element manufactured as a single piece. In the manner already described (FIGS. 2 and 3) the component shown in FIG. 6 now needs to be completed by a damping element which is to be installed by means of injection molding directly in the attachment section 5.

Figure 7:
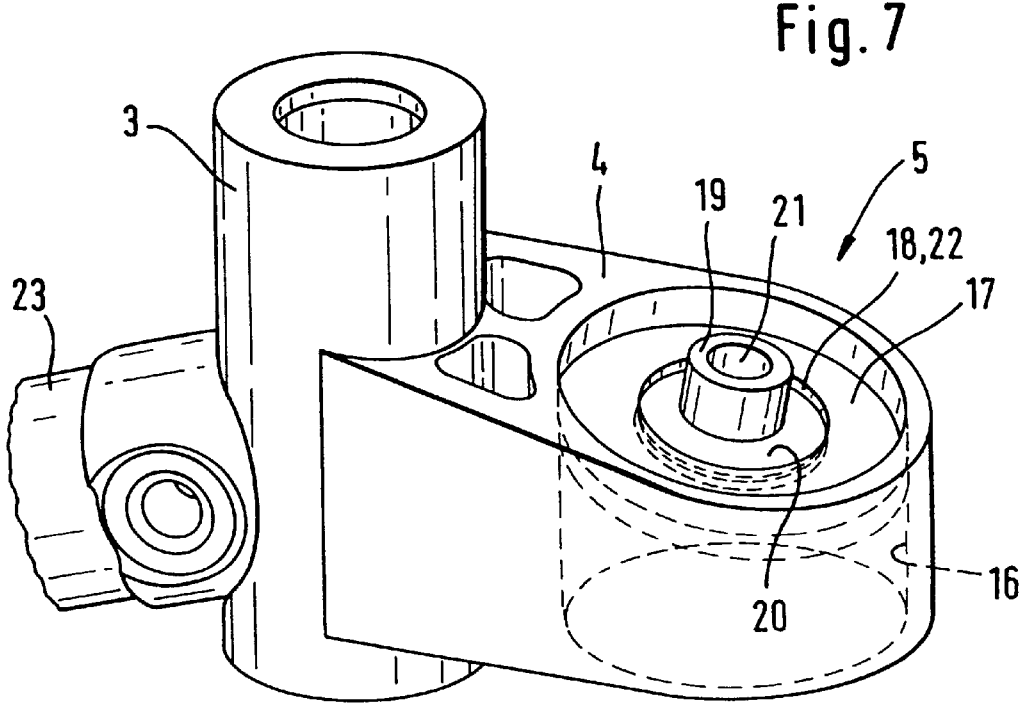

FIG. 7 shows another example of an attachment section which is equipped with essential properties of the example shown in FIGS. 4 and 5. Here, again, a repetition of the description of these already disclosed properties is omitted. Thus, again, we see a bearing element 3 for a wiper shaft (not illustrated) at whose perimeter there is a left-side attachment lug 23 molded on (not entirely visible in this figure), with which the bearing element 3 can be attached free of rotational play to the connecting rod 2 (FIG. 1) of a windshield wiper drive unit. On the right side, at the outer side of the bearing element 3, there is again an attachment protrusion 4 molded on, which has an attachment section 5. In a recess 16 in the region of the attachment section 5, there is again a ring-shaped rib 17 whose inner edge 22 also forms the circular passage opening 18. The bushing 19 extends through the passage opening 18 and is positioned concentrically therein. The annular gap present between the edge 22 of the rib 17 and the perimeter of the bushing 19 is bridged by the single, closed lamina, which functions as a ridge 20. The thin-wall ridge 20 is thus designed so that it fully closes the aforesaid annular gap and connects the casing 19 with the rib 17. Accordingly, the entire component represented in FIG. 7 is manufactured as a single piece. Analogous to FIG. 6, the component illustrated in FIG. 7 must be completed by a damping element in its attachment section 5. As already described in FIGS. 4 and 5, the damping element in this case would have to consist of two mutually separated parts, each of which can be injected separately from above or from below into the attachment section 5. In the example shown in FIG. 7, the attachment screw is inserted from below into the passage opening 21 of the bushing 19.

We should mention that an attachment section 5 according to this invention can also be formed on an attachment plate, such as the extender 10 of the windshield wiper system (FIG. 1). It is not necessary that the attachment section 5 have an opening 16 which bounds the damping element 11 at its outer mantle surface. When using a corresponding injection mold, a damping element 11 can also be injected in this case in the attachment section 5. The damping element 11 and the bushing 19 in this case protrude from both sides of the support plate featuring the attachment section 5.

List of Reference Numbers
1 Support frame
2 Connecting rod
3 Bearing element
4 Attachment protrusion
5 Attachment section
6 Wiper shaft
7 Connecting linkage
8 Crank
9 Drive motor
10 Extender
11 Damping element
12 Attachment screw
13 Chassis part
14 Threaded hole
15 Support part
16 Opening
17 Rib
18 Passage opening
19 Bushing
20 Ridge
21 Passage opening
22 Edge
23 Attachment pin
D Thickness
d Thickness

We claim:
1. A windshield wiper system with a noise-damping and vibration-damping attachment feature for attachment to a vehicle chassis, wherein a damping element is located in a passage opening of an attachment section of the windshield wiper system, and a bushing to hold an attachment means consisting of one element out of the group containing a bolt and a screw is located in a generally central passage opening of the damping element, wherein a) the attachment section and the bushing are manufactured as a single part from the same material;

b) the bushing is held by means of a single ridge at a distance from an edge of the passage opening of the attachment section and is at least temporarily connected via the single ridge to the attachment section, wherein said single ridge is in the form of a continuous lamina and bridges the annular gap between bushing and edge of the passage opening in the attachment section wherein the lamina is of ribbed form in the direction of the width of the annular gap between bushing and edge of the passage opening; and c) the material of the damping element is filled into the spaces between attachment section and bushing.

2. A windshield wiper system with a noise-damping and vibration-damping attachment feature for attachment to a vehicle chassis, wherein a damping element is located in a passage opening of an attachment section of the windshield wiper system, and a bushing to hold an attachment means consisting of one element out of the group containing a bolt and a screw is located in a generally central passage opening of the damping element, wherein a) the attachment section and the bushing are manufactured as a single part from the same material;

b) the bushing is held by means of at least one ridge at a distance from an edge of the passage opening of the attachment section and is at least temporarily connected via the at least one ridge to the attachment section;

c) the material of the damping element is filled into the space between attachment section and bushing wherein the at least one ridge has a set fracture point at which it will fracture under mechanical load.

3. The windshield wiper system according to claim 2, wherein several ridges extend like spokes between the bushing and the attachment section.

4. The windshield wiper system according to claim 2, wherein several ridges extend like vanes between the bushing and the attachment section.

5. The windshield wiper system according to claim 2, wherein said at least one ridge has a bended shape.

6. The windshield wiper system according to claim 2, wherein said at least one ridge includes a lamellar design.

7. The windshield wiper system according to claim 2, wherein said at least one ridge runs at least approximately tangential into the outer mantle surface of the bushing.

8. The windshield wiper system according to claim 2, wherein the component of the windshield wiper system which has the attachment section is manufactured as a metal cast article.

9. The windshield wiper system according to claim 2, wherein the component of the windshield wiper system which has the attachment section is manufactured as an injection molded plastic article.

* * * * *